US012705644B2

(12) United States Patent
Thompson et al.

(10) Patent No.: US 12,705,644 B2
(45) Date of Patent: Aug. 11, 2026

(54) TECHNIQUES FOR BRANCHING AN AUTOMATED MESSAGING CAMPAIGN

(71) Applicant: Twilio Inc., Francisco, CA (US)

(72) Inventors: Nathanael Thompson, San Francisco, CA (US); David Zuluaga, San Francisco, CA (US); Ami Gandhi, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 68 days.

(21) Appl. No.: 18/534,031

(22) Filed: Dec. 8, 2023

(65) Prior Publication Data

US 2025/0191028 A1 Jun. 12, 2025

(51) Int. Cl.
*G06Q 30/00* (2023.01)
*G06Q 30/0251* (2023.01)
*G05B 19/418* (2006.01)

(52) U.S. Cl.
CPC ..... *G06Q 30/0264* (2013.01); *G06Q 30/0269* (2013.01)

(58) Field of Classification Search
CPC ....................... G06Q 30/0264; G06Q 30/0269
See application file for complete search history.

(56) References Cited

U.S. PATENT DOCUMENTS

2015/0149237 A1* 5/2015 Brock ................ G06Q 10/0633 705/7.27
2017/0213242 A1* 7/2017 Sundaram ............... H04L 43/08

OTHER PUBLICATIONS

"An overview of computational challenges in online advertising". IEEE. 2013. (Year: 2013).*
"In-Depth Survey of Digital Advertising Technologies". IEEE. 2016. (Year: 2016).*

* cited by examiner

*Primary Examiner* — Maria V Vanderhorst
(74) *Attorney, Agent, or Firm* — Schwegman Lundberg & Woessner, P.A.

(57) ABSTRACT

Described herein are techniques for conducting an automated marketing campaign that provides for branching conditions. Accordingly, the marketing campaign is defined such that a contact who is scheduled to receive messages as part of the campaign will receive specific messages depending upon the contact group of which the contact is a member. Therefore, the conditional branching is achieved via contact record updating service that iteratively updates various contact groups by executing predefined contact grouping queries. As the contact record updating service is integrated with a customer data platform, branching conditions can be specified at a granular level based on very specific event data—for example, such as when a customer interacts with various user interface elements of an application, or concludes a purchase transaction with an e-commerce shopping cart, and so forth.

20 Claims, 9 Drawing Sheets

TECHNIQUES FOR BRANCHING AN AUTOMATED MESSAGING CAMPAIGN

TECHNICAL FIELD

The present application generally relates to messaging systems that provide for the creation and execution of automated messaging campaigns. More precisely, the present application describes an innovative technique providing a marketer with a means for establishing an automated messaging campaign with automated branching logic, which facilitates dynamically determining an order in which messages are sent to members of the target audience, based on the updating of contact records that occurs during the active stage of the automated messaging campaign.

BACKGROUND

In marketing, messaging systems (e.g., email, SMS, text message, instant messages, etc.) are frequently utilized by marketers as one of a variety of tools for executing a marketing campaign. A messaging system is a software-based system that allows a marketer or marketing team to author one or more messages, and then, in some instances, automate the delivery of the messages to each member of a target audience. Often, the one or more messages share a common theme or objective. For example, an automated marketing campaign may be established to welcome new end-users to a web-based service after each end-user initially registers as an end-user of the service. As such, each message may provide information that introduces the new end-user to a different aspect or feature of the web-based service, with the ultimate objective of encouraging new end-user engagement with the service. In yet another example, a promotional marketing campaign may be established to promote a new feature or service. An automated marketing campaign may be established to encourage an end-user to connect with an enterprise via one or more social networking channels. An automated marketing campaign—sometimes referred to as a "post purchase" campaign—may be established to send messages to customers who have recently made a purchase. Accordingly, one message in the automated marketing campaign may promote products that are complimentary to the one previously purchased. Another message in the marketing campaign may encourage the customer to provide a web-based review of the product or service that was purchased. Of course, many other types of automated marketing campaigns are possible.

BRIEF DESCRIPTION OF THE DRAWINGS

Embodiments of the present invention are illustrated by way of example and not limitation in the figures of the accompanying drawings, in which.

DETAILED DESCRIPTION

Figure 1:
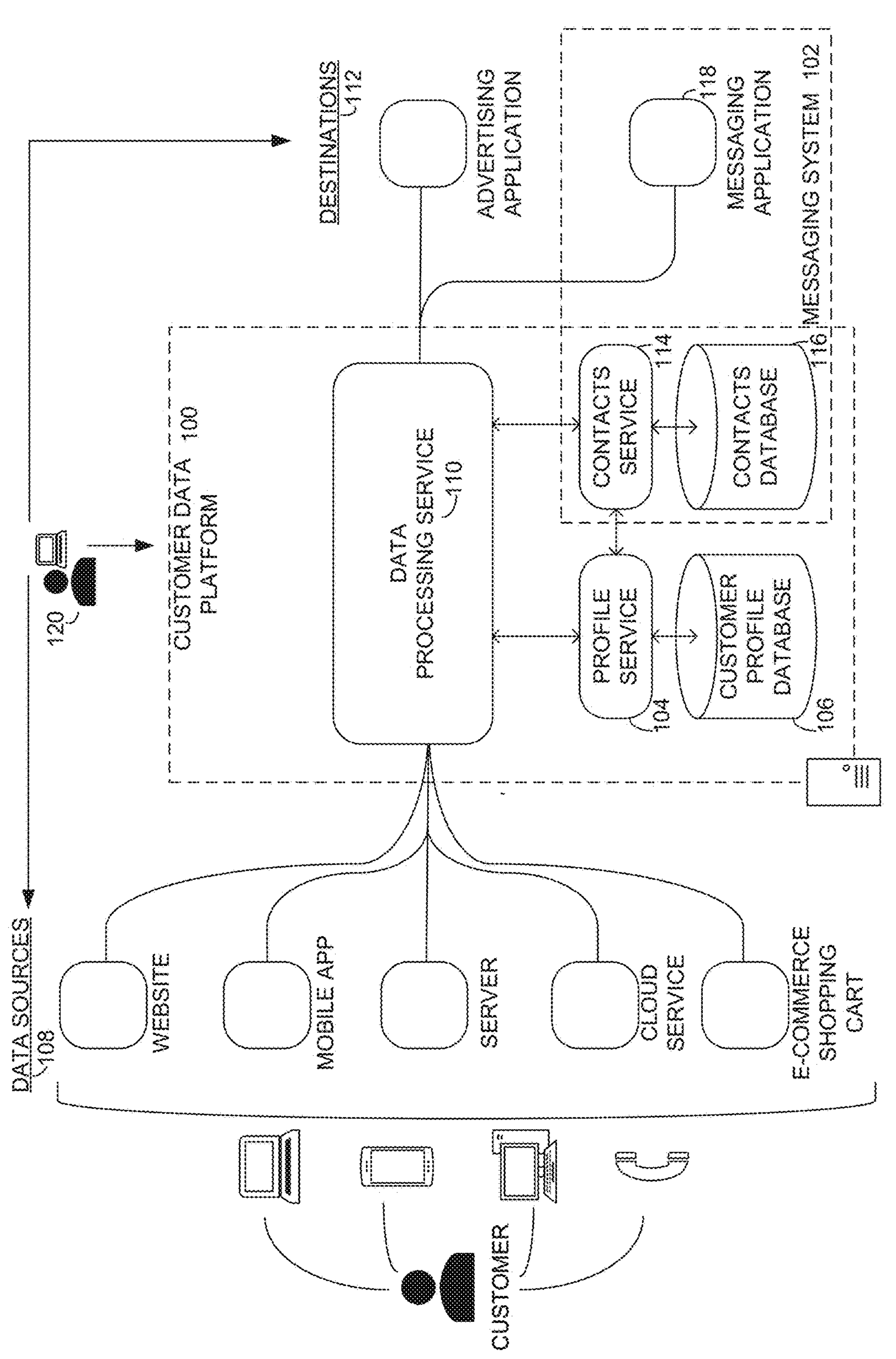
FIG. 1 is a diagram illustrating an example of a customer data platform with which a messaging system, having an automated marketing campaign feature, consistent with embodiments of the present invention, may be integrated and deployed.

Described herein are methods and systems that provide for the creation and execution of automated marketing campaigns that support automated branching—specifically, the creation of rules-based conditions or conditional statements, which, when evaluated during the marketing campaign, result in dynamically changing the series of messages that are communicated to a member of the target audience. The branching functionality described herein allows for targeting message recipients with more relevant content during an active, automated marketing campaign, by changing the series of messages that are communicated to a message recipient in response to various events. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

For purposes of the present disclosure, the terms "automated marketing campaign," "marketing campaign automation," and simply, "automation" are used synonymously in reference to one or more pre-defined series of messages that are scheduled for communication to a message recipient who is a member of a target audience. For instance, each automation or automated marketing campaign is defined by a set of configuration parameters and associated content (e.g., messages), where the configuration parameters define the target audience, the schedule by which messages are communicated to members of the target audience, the entry and exit criteria for the target audience, any branching conditions that may impact the specific messages that are sent to a member of the target audience, and other aspects that determine the behavior for the automation. The terms "end-user" and "marketer" are used synonymously in reference to a person who uses a software-based messaging system or service to establish and conduct an automated marketing campaign. Similarly, the terms "contact" and "customer" are used in reference to a person who may be specified as a message recipient, as part of a target audience for an automated marketing campaign, and as a result, receive messages as part of an automated marketing campaign. While the terms "customer" and "contact" may both be used to reference a person to whom a message may be communicated, at least in some instances, a customer profile, stored in a customer profile database, may be created separately, distinct from a contact record, stored in a contacts database. For instance, at least with some embodiments, a customer profile may exist for a customer whose identity is not known. However, in general, a contact record exists in a contacts database for only those customers whose identity has been resolved and for which some identifying information is known (e.g., an email address or telephone number). As described in detail below, the messaging system leverages the contact records stored in a contacts database for purposes of defining the target audience for an automated marketing campaign. For example, a marketer, as an end-user of a messaging application or system, may interact with various user interfaces of the messaging system to author or create messages (e.g., emails, SMS or text messages, instant messages) and establish configuration parameters for an automated marketing campaign. Once the automated marketing campaign is activated or invoked, contacts, who are defined to be part of the target audience, will receive messages so long as the contact record of the contact does not satisfy any exit criteria specified for the automation. Accordingly, before sending a message to a contact, the messaging system will verify that a contact record associated with the contact has not been updated in some way that would cause the contact to be excluded from the marketing campaign. As described in greater detail below, prior to sending a message to a member of the target audience, any branching conditions specified for the automation will be evaluated. Depending upon the result of the evaluation of the branching condition, a message recipient will be sent one of two different messages.

An automated marketing campaign may send messages that are automatically communicated to a contact that is specified as a member of a specific audience for the marketing campaign. For example, for a specific automated marketing campaign, a marketer will generally create a series or sequence of messages that are to be communicated to a contact, one message at a time and in an order established by the marketer. Generally, the messaging system will ensure that some duration of time has passed between the sending of messages to the same contact. The specific duration of time may be established as a system default, or in some instances may be customized by the end-user on a per message basis. Each message is typically created for the purpose of influencing or persuading the behavior of the message recipient, for example, by encouraging the message recipient to take some specific action. Accordingly, a marketer may have many different automated marketing campaigns, with each individual marketing campaign being associated with a different objective or goal.

With conventional messaging systems, once an automated marketing campaign has been initiated for a particular target audience, the marketing campaign executes until each contact has received all messages that are defined by the marketer to be part of the automated marketing campaign. Accordingly, with conventional messaging systems, there is no mechanism by which a marketer can plan to dynamically end the campaign, modify the order of messages, or change the content of the messages, once the automated marketing campaign has been invoked. Conventional messaging systems that provide for the creation and execution of automated marketing campaigns generally do not allow for changing the flow of messages that are communicated to a message recipient in response to activities of the message recipient that may occur during the automated marketing campaign.

By way of example, a marketer may create a marketing campaign that is aimed at convincing a contact to purchase a specific product or service. With a conventional automated marketing campaign, if a message recipient concludes a purchase transaction for the product or service after receiving two of five messages that are defined for the marketing campaign, the message recipient will receive the remaining three messages of the campaign. At best, the message recipient is likely to ignore the three messages, as the message recipient has already purchased the product or service that the three messages are promoting. Worse, the message recipient may be annoyed by receiving the irrelevant messages.

Consistent with embodiments of the present invention, when establishing an automated marketing campaign, a marketer or end-user of the messaging system is prompted to optionally specify a branching condition that, in some instances, will be evaluated prior to sending any message. In general, the branching condition is specified as a conditional statement, or a combination of conditional statements logically joined by operators (e.g., AND, or OR), and referencing values for one or more fields in a contact record. For example, each contact may have a contact record in a contacts database. A custom field may be created to capture various event data relating to the contacts. Accordingly, when a contact takes some specific action, the value for the custom field associated with the contact record for that contact may be updated to reflect the specific event or interaction undertaken by the contact. During an active automated marketing campaign, prior to sending a message to a message recipient in the target audience, a branching condition is evaluated. Accordingly, based on the evaluation of the branching condition, one of two different messages may be sent to the contact-depending upon the value of a field in the contact record for that contact. For instance, when a value for a specific field referenced in a conditional statement that defines a branching condition for an automated marketing campaign is updated to reflect that the contact has taken a specific action, the conditional statement may evaluate to TRUE (or FALSE). Depending on the result, the series of messages that are sent to the contact can be dynamically changed during the active stage of the automated marketing campaign.

Consistent with some embodiments, each conditional statement that defines a branching condition is used to form what is referred to herein as a contact grouping query. During the active stage of an automated marketing campaign, a contact service—that is, a software-based service that manages and updates contact records and forms contact groups via the execution of queries—will iteratively execute various contact grouping queries associated with the marketing campaign to establish different groups of contacts. For example, a first conditional statement may be used to establish a first contact grouping query, which, when executed, establishes a group of contacts that are defined as the initial or target audience for the automated marketing campaign. Accordingly, during the automated marketing campaign, as the first contact group is periodically updated as a result of the contact service executing the first contact grouping query, a first series of messages may be communicated to those contacts who are in, and who are added to, the first contact group. The contact service may simultaneously execute a second or third contact grouping query that defines a second and third contact group, where one or both of the second and third contact groups may be associated with a branching condition. For example, when the marketer establishes a conditional statement for defining a branching condition, the conditional statement may be used to establish a contact grouping query to generate a contact group representing those contacts who satisfy the branching condition. Accordingly, at any time during the active stage of the automated marketing campaign, as the contact service continuously and iteratively executes the various contact grouping queries, contacts may move from one contact group (e.g., a first contact group for the initial target audience) to a second or third contact group (e.g., a contact group for contacts having contact records that satisfy the relevant branching condition). As each contact group may be associated with a separate assigned series of messages, the order in which any particular contact receives a message will depend upon which contact group the contact is in at various points in time.

Consistent with some embodiments, the contact service may be integrated with a customer data platform. Accordingly, the contact records that are managed by the contact service may include data fields for capturing and storing very granular event data that results from a customer or contact interacting with any of a wide number of individual data sources configured to operate in connection with the customer data platform. Continuing with the example set forth above, if a contact or message recipient concludes a transaction for a product or service after receiving two messages of an automated marketing campaign, a branching condition defined for the campaign may be used to alter the flow of messages that are sent to the contact. Accordingly, if a branching condition is established to evaluate a specific data field of the contact record that is used to indicate whether the contact has concluded a purchase transaction for a specific product or service, the flow of messages can be altered based on whether a contact has, or has not, purchased a specific product or service. By specifying branching conditions for an automated marketing campaign, a marketer can control and modify the flow of messages that are communicated to a contact, using a wide variety of very granular and specific customer data and customer event data. The conditional statements defining the branching conditions can be connected to engagement events, reserved fields, and custom fields of a contact record. Furthermore, the data fields and events upon which the branching conditions may depend, may be written with data in real-time, in near real-time, or on a periodic schedule (e.g., every hour), from a customer data platform that is configured to obtain and process customer data and customer event data from a wide variety of data sources. Accordingly, as customer interactions are detected, the customer data and customer event data associated with a customer interaction that is captured as a result of the customer interaction may be processed and written to a contacts database accessible to the messaging system and associated with the contact record of the customer. Consequently, interactions of the customer can ultimately trigger the satisfaction of a conditional statement associated with a specific branching condition, resulting in a contact being removed from one contact group and added to another contact group, such that the flow of messages communicated to the customer is modified. As such, a marketer may specify branching conditions for a marketing campaign, such that the flow or series of messages that are scheduled to be sent to the contact change when the contact performs any of a wide variety of actions, such as: interacting with specific elements of a user interface (web-based, mobile applications, and so forth), concluding a transaction for the purchase of a product or service, engaging with a sales representative via a telephone call or interactive chat session, and many others.

By way of example, consider a scenario in which a marketer establishes an automated campaign aimed at persuading contacts to register for and attend a web-based product demonstration for a particular product or service with the ultimate goal of convincing contacts to purchase the product or register to use the service. If, during the automated marketing campaign, a determination is made that a contact has purchased the product, or registered to become an end-user of the service, a branching condition can be used in the automated marketing campaign to change the flow or series of messages that are communicated to the contact. For example, based on the evaluation of a branching condition—more specifically, the execution of a contact grouping query that is based on the branching condition—a contact may be moved from one contact group, associated with a first series of message, to a second contact group, associated with a second series of messages. Accordingly, the second series of messages can be communicated to the contact, where the second series of messages aim to introduce various aspects and features of the product or service to the customer, who now owns the product or is a registered user of the service. Other aspects and advantages of various embodiments of the present invention will be readily apparent from the description of the several figures that follows.

FIG. 1 is a diagram illustrating an example of a customer data platform 100 with which a messaging system 102, consistent with embodiments of the present invention, may be integrated and deployed. A customer data platform 100 is a software-based system having a customer profile service 104 for creating a persistent, unified customer profile database 106 that is accessible to a variety of applications and software-based systems (e.g., destinations 112). Customer-related event data, referred to herein as customer data and customer event data, are obtained from a variety of data sources 108 (e.g., customer touch points). The customer-related data, when received at the customer data platform 100, is processed by a data processing service 110 to "clean" the data. In this context, cleaning the data may involve validating or verifying the data, associating the customer-related data with existing customer profiles, and formatting the data. Finally, the customer-related data is forwarded to one or more data services, such as the customer profile service 104, which may combine or add the customer-related data with previously obtained customer-related data, to create for each customer a customer profile stored in a customer profile database 106.

Consistent with some embodiments, each of several different data services may subscribe to receive customer-related data from the data processing service 110. Accordingly, at least with some embodiments, in addition to a customer profile service 104, a contacts service 114 may receive customer-related data directly from the data processing service 110 and store the customer-related data in association with existing contact records in the contacts database 116. For instance, if a customer interacts with a website by concluding a purchase transaction for a product or service, the customer event data reflecting the transaction may be communicated from the website to the data processing service 110 of the customer data platform 100. In processing the customer event data, the data processing service 110 may leverage an identity resolution service (not shown) to associate the customer event data with the identity of a known customer or contact. Accordingly, when the customer event data can be associated with an existing customer or contact, the data processing service 110 may forward the customer event data to the contacts service 114, which will then store the customer event data in a data field of a contact record associated with the identity of the contact. Accordingly, each contact record in the contacts database 116 maintained by the contact service 114 may have a number of custom-defined fields, in addition to other data fields, to store specific customer event data associated with contacts who have interacted with any of a number of data sources 108. In some instances, the customer-related data that is written to a customer profile in the customer profile database 106 may also be accessed by the contacts service 114, and ultimately written to a contact record of a contact in the contacts database 116.

In general, the customer-related data arrives at the customer data platform 100 as a result of various interactions by customers with different data sources 108. Each instance of customer-related data may be associated with an event type corresponding with a specific API call or request from which the data was generated. The nature of the customer-related data may vary from one data source to the next, but will generally relate to and describe an interaction that a customer has had with one of a variety of data sources that have been configured, by an end-user 120, to operate with the customer data platform 100. Some customer-related data may be system defined, such that the customer-related data and format of the data is known in advance. In other instances, the customer-related data that results from a customer interaction may be customized for a specific application. By way of example, the customer-related data that may be included in a customer profile, and therefore accessible to the contacts service 114, may include, but is certainly not limited to:

- Customer event data: web browsing activity, actions on a website or in an app, click data, and so forth.
- Transactional event data: data relating to purchases, returns, data from a point-of-sale terminal, or e-commerce shopping cart.
- Customer attributes: age, gender, birthday, date of first purchase, customer prediction data.
- Campaign evaluation data: impressions, clicks, reach, engagement, emails opened or viewed, etc.
- Customer-company history: data from interactions with customer service, Net Promoter Scores (NPS), data from chatbots, social media posts, survey verbatims, focus group transcripts, call center audio files, etc.

The above categories of customer-related data are provided as examples and to generally convey an understanding of the overall innovative subject matter. It will be readily appreciated that with various implementations of different customer data platforms, the nature of the customer-related data may differ from one implementation to the next, and the customer-related data may be categorized and/or referenced differently.

As shown in FIG. 1, the messaging system 102 is generally comprised of a messaging application 118, which is integrated with and configured to operate in connection with the contacts service 114 of the customer data platform 100. For example, the messaging system 102 may be a distributed system in which the contacts service 114 and the messaging application 118 reside and execute on separate computing devices. Consistent with some embodiments, the messaging system 102 may be a client-server-based system, such that marketers access the messaging application 118 via a web-browser application. Of course, with some alternative embodiments, various other system architectures may be utilized. For instance, with some embodiments, the contacts service 114 and the messaging application 118 may reside and execute on the same computing device. Although not shown in FIG. 1, consistent with some embodiments, the contacts service may include one or more data processing pipelines for uploading and maintaining contact records in a virtual data warehouse where contact grouping queries are executed to group contact records into groups by common characteristics. Accordingly, as new and updated contact data are obtained by the contacts service, the new and updated contact data may be periodically (e.g., based on a schedule) processed by the data processing pipeline to update the groups of contacts stored in the virtual data warehouse.

Consistent with some embodiments, a marketer may interact with various user interfaces facilitated by the messaging application 118 to generate and invoke automated marketing campaigns. As part of defining an automated marketing campaign, a marketer may specify automatic exit criteria for the automated marketing campaign, and may also specify branching conditions for the automated marketing campaign. For example, the marketer may specify one or more rules-based conditions or conditional statements, which reference one or more data fields in a contact record in the contacts database 116 managed by the contacts service 114. Accordingly, the data fields that may be referenced as part of a rules-based condition may reflect values based on customer-related data that has been obtained from any of a wide variety of data sources 108. For instance, as shown in FIG. 1, the data processor 110 of the customer data platform 100 may be configured to receive customer-related data from a wide variety of data sources 108. Using various application programming interface (API) calls, when a customer interacts with a website, a mobile application, various servers, cloud-based applications, and even e-commerce shopping carts, an API call may be triggered to communicate customer-related data to the data processing service 110 of the customer data platform 100. The data processing service 110 will then process the received data by ensuring the source of data is verified, and the format of the data is appropriate. The customer-related data may then be forwarded to the contacts service 114, which will then add the data to the appropriate contact record in the contacts database 116. As the contacts service 114 executes various contact grouping queries, new and/or updated contact data is ultimately written to a virtual data warehouse, which may result in a contact record being removed from one group of contacts and being added to a different group of contacts. Accordingly, during the automated marketing campaign, as different series of messages are tied to or associated with different contact groups, a different series of messages may be assigned to be sent to contacts who are members of different contact groups. For example, as contact records are updated periodically, the contacts will change contact groups (based on the branching condition set by the marketer), and the flow of messages that are sent to the contact will change as the contact record is added to and/or removed from different contact groups (e.g., contact group tables).

Figure 2:
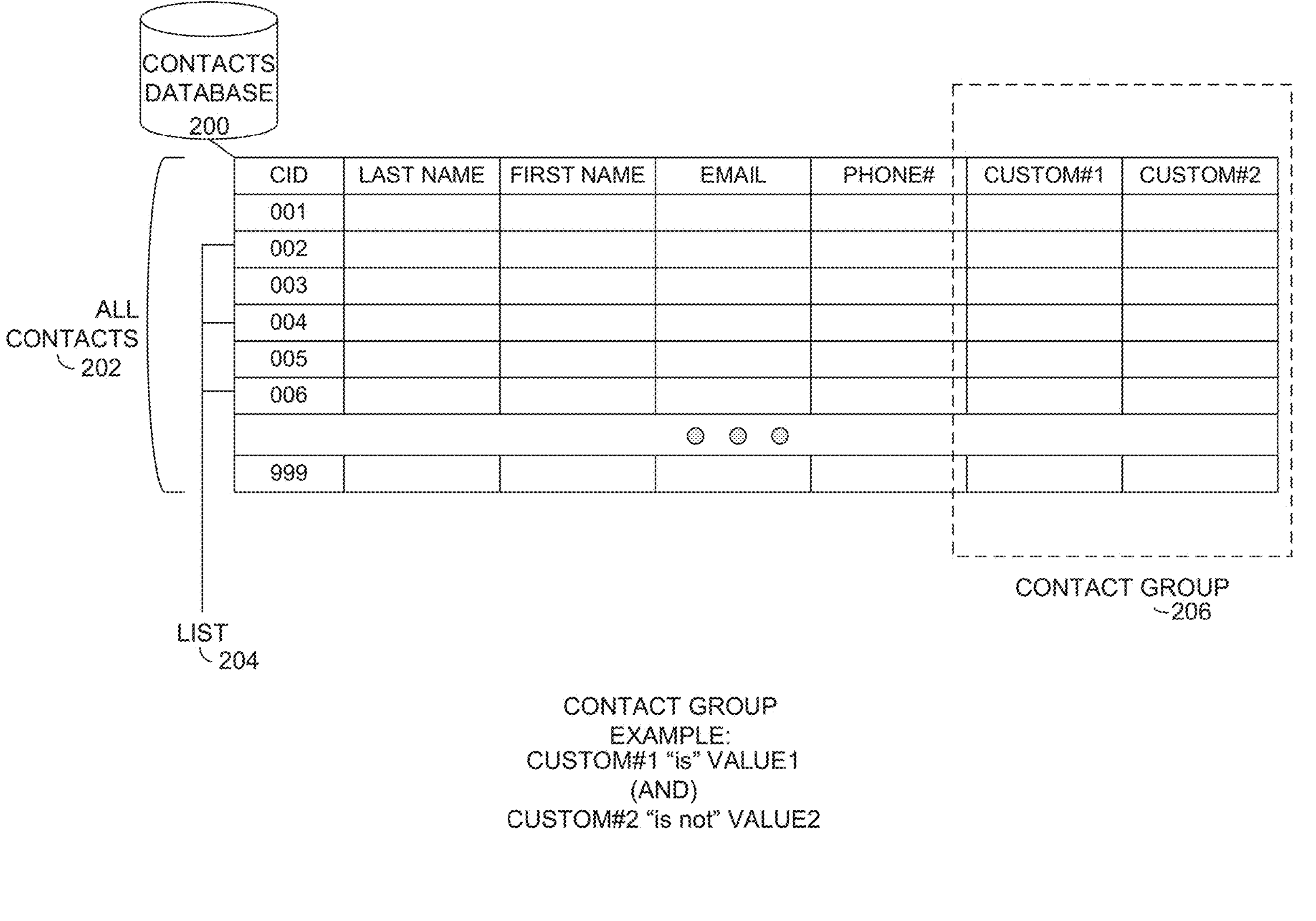
FIG. 2 is a diagram illustrating an example of a contacts database including contacts that may be included as members of a target audience for an automated marketing campaign, consistent with embodiments of the invention.

FIG. 2 is a diagram illustrating an example of a contacts database 200 from which a contact group for an automated marketing campaign may be selected or defined. As part of defining the various parameters for an automated marketing campaign, a marketer will define or create a contact group for a target audience to receive messages. In various embodiments, the manner by which a target audience is created may differ. For instance, many messaging systems integrate with existing contacts databases, thereby providing the marketer with access to existing contact information for establishing a target audience. In many instances, when establishing or defining a target audience for a particular marketing campaign, a marketer may define what is referred to herein as a contact group. A contact group is a collection of contact records that share some common characteristics, as determined by a contact grouping query that is executed against some set of contact records. The contact grouping query is based on a conditional statement, or a combination of conditional statements joined by a logical operator (e.g., AND or OR), and representing the desired characteristics (e.g., the entry criteria) of the target audience. By way of example, and with reference to FIG. 3, a target audience for a marketing campaign may be defined as a group of contacts, where each contact in the group is a female living in the city of Chicago.

As contact records are updated over time as an automated marketing campaign is in an active state, new contact records may enter the contact group defined as the target audience, and existing contacts may exit the contact group defined as the target audience. For instance, continuing with the example as presented in FIG. 3, if a customer having a contact record in the contact group that is defined for the target audience updates his or her address to reflect a new city of residence (other than Chicago), the contact record for that customer will exit the group of contacts that defines the target audience. Similarly, if a contact record is updated to reflect that a customer has recently relocated to the city of Chicago, when the contact grouping query is executed to update the group of contacts, the contact record for that customer may be added to the target audience, and thus the automated marketing campaign may be invoked for that customer.

By defining the target audience as a dynamic contact group that may change over time, a triggering event—a concept referred to herein as entry criteria—may cause a contact to become a member of the target audience. By way of example, a triggering event may be as simple as the initial creation of a contact record in the contacts database, for example, which may occur when a person provides personal information about him or herself when first registering as an end-user of an application, online service, or website. Accordingly, an automated marketing campaign may be established by a marketer so that, after a person first registers to become an end-user of an application or online service for the very first time, a first email message is sent to the new contact welcoming the person as a new end-user. A triggering event may be based on a data field having a specific value. Accordingly, if a contact record for a specific contact is updated by writing to the specific data field a specific value, this could result in a triggering event—meaning, the contact would satisfy the entry criteria and become a member of the contact group that defines the target audience.

Figure 3:
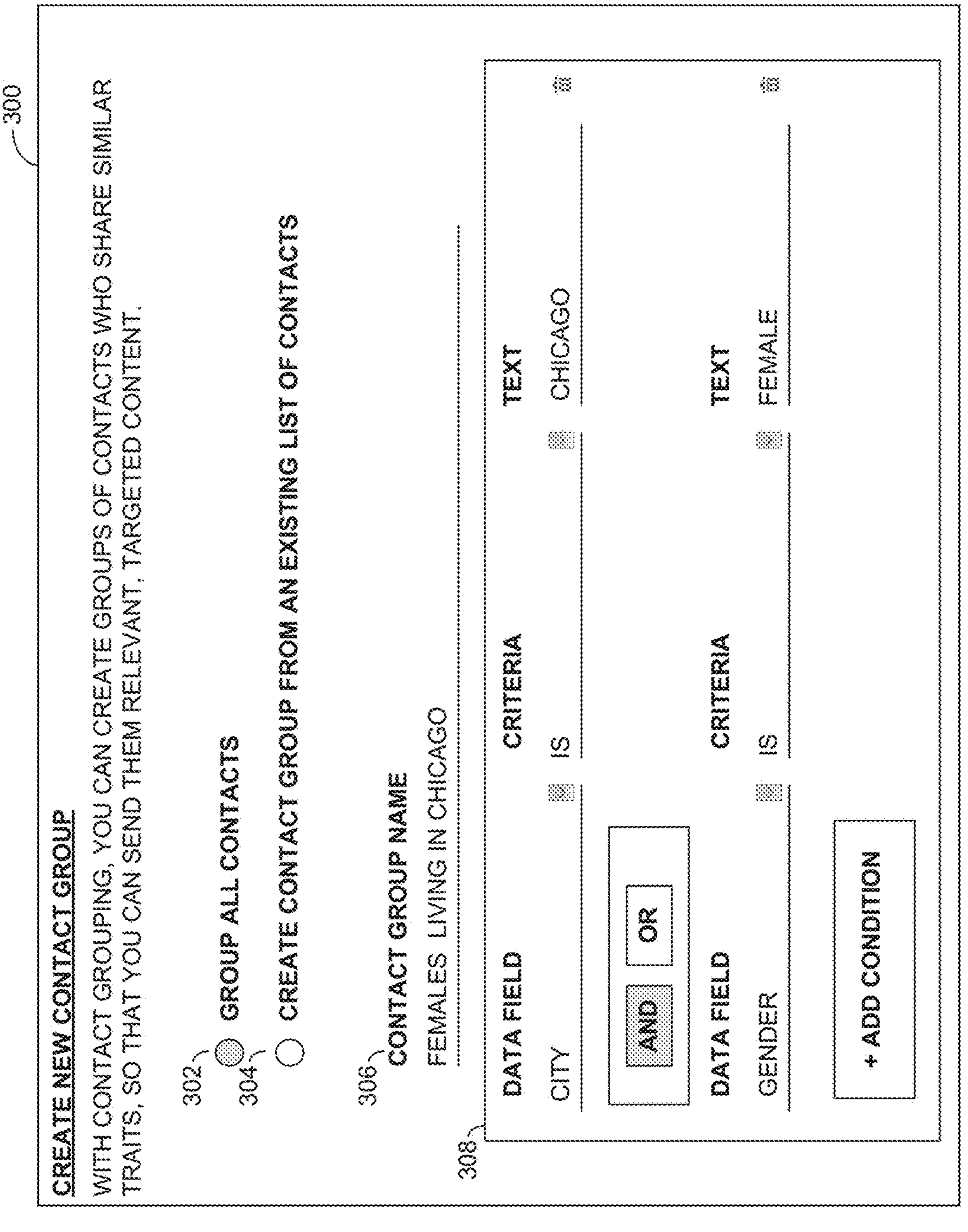
FIG. 3 is a user interface diagram illustrating an example of a user interface via which an end-user may specify a target audience for an automated marketing campaign by defining a contact group, consistent with embodiments of the present invention.

As shown in FIGS. 2 and 3, with some embodiments, a marketer may define a target audience for an automated marketing campaign by creating a group of contacts, by selecting contacts with certain characteristics from all contacts 202 in a contact database. Alternatively, a marketer may define a target audience by creating a group of contacts from an existing list 204 of contacts. In this context, a list of contacts is a static subset of contacts. For instance, as shown in FIG. 2, a list of contacts 204 may be defined to include those contacts with contact identifiers (CID) shown as "002," "004," and "006."

By way of example and as shown in FIG. 2, each individual contact record in the contacts database has or is otherwise associated with two separate custom data fields—"CUSTOM #1," and "CUSTOM #2." These are data fields that may be added by the end-user, that is, the marketer who is creating the automated marketing campaigns. A group of contacts may be defined by specifying a condition with reference to any of the data fields in a contact record, and specifically, with reference to one or more custom data fields. For instance, in the example of FIG. 2, a dynamic subset of contacts may be defined by a contact grouping query executed to group those contacts satisfying the conditional statement, "CUSTOM #1=VALUE (AND) CUSTOM #2!=VALUE." As such, any contact associated with a contact record that has data in the data fields (e.g., CUSTOM #1 AND CUSTOM #2) satisfying the conditional statement established by the selected operator and value for the conditional statement, will be included in the contact group. As will be described in greater detail below, a group of contacts may be used to define not only the members of the target audience, but also those members who have exited the target audience by means of custom-defined exit criteria established for the automated marketing campaign.

As illustrated in the example user interface 300 of FIG. 3, to establish a contact group, the end-user must first select whether the contact group is to be based on all contacts 302, or alternatively, based on contacts in an existing list of contacts 304. Additionally, the end-user must specify a contact group name 306 for the contact group. Finally, the end-user must specify one or more conditional statements 308 from which the contact grouping query will be established. Of course, if the intent is to include all contacts in the target audience, the end-user can simply skip the step of creating a conditional statement for the contact group, in which case, all contacts would be included in the contact group, and thus the target audience. Similarly, if the intent is to select a specific list of contacts without further conditions, the end-user can select the option 304 for generating a contact group from a list, and then select all contacts in the list as the target audience by not adding any additional selection criteria (e.g., a conditional statement, such as shown with reference 308).

By way of example, an end-user may indicate that a contact group is to be established based on all contacts in a contacts database. In this case, the conditional statement 308 is evaluated against all contact records for the contacts database. In the example presented in FIG. 3, if all contacts 302 has been selected, the relevant set of contacts included in the contact group defining the target audience would be all contacts for which the values in their respective contact record satisfy the conditional statement 308. Here, the conditional statement indicates that the City (e.g., a data field) is Chicago (e.g., the value for the data field, City) and that the gender is female. Accordingly, the resulting set of contacts included in the contact group, and thus the target audience, are all females living in the city of Chicago. Alternatively, if the end-user specifies that the contact group is to be based on an existing list of contacts (e.g., the option with reference number 304), the conditional statement would be evaluated against only those contact records that are included in the specified list.

It will be appreciated that the advantage in using a dynamic contact group in defining the target audience is that the target audience can be specified by any of several known characteristics of the various contacts for which data exists in the contact records. Furthermore, by using a contact group as described in connection with FIGS. 2 and 3, the target audience can be defined dynamically. That is, as the various values of the data fields defining the contact group change over time, contact records may be added and removed from the contact group. By way of example, if someone updates their residential address as a result of moving from one city to another city, that person may be added to, or removed from, a specific contact group. As described in greater detail below, this may also impact the set of messages that are communicated to the person.

Figure 4:
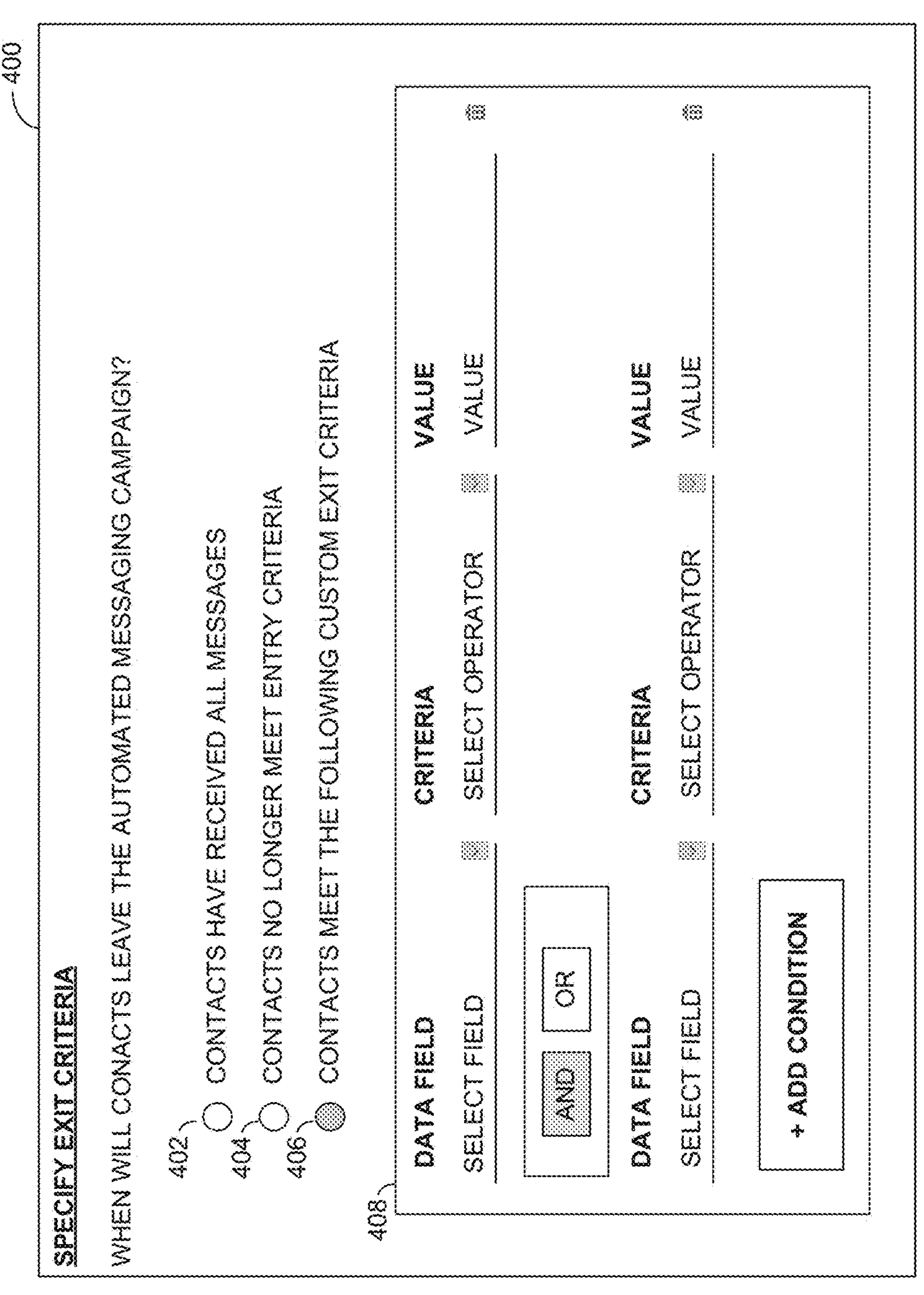
FIG. 4 is a user interface diagram illustrating an example of a user interface via which an end-user may specify whether an automated marketing campaign is to include custom exit criteria, and if so, a condition, which, when satisfied, will cause a contact to be removed from the target audience for the marketing campaign, according to some embodiments.

FIG. 4 is a diagram illustrating an example of a user interface 400 via which a marketer may specify whether an automated marketing campaign is to include automated exit criteria, and if so, a condition, which, when satisfied, will cause a contact to be removed from the marketing campaign, according to some embodiments. An end-user or marketer of a messaging system may be presented with various user interfaces for purposes of obtaining information from the end-user in order to establish a marketing campaign. As shown in FIG. 4, an end-user is being prompted to specify one of three options for establishing exit criteria for a marketing campaign. In this example, the first option 402 indicates that a contact should exit an automated marketing campaign only upon receiving all of the messages that have been specified for the automated marketing campaign. The second option 404 indicates that a contact should be removed from the automated marketing campaign when some condition associated with the entry criteria has changed, such that the contact (or, more precisely, the contact record associated with the contact) no longer satisfies the entry criteria. Finally, the third option—shown as the specified or checked option in the example of FIG. 4—indicates that a contact should be removed from an automated marketing campaign when the contact satisfies custom exit criteria. When this option is selected the user interface 400 shows various control elements that enable the marketer to establish or define a conditional statement as the exit criteria. Specifically, as shown in FIG. 4, user interface elements 408 are shown allowing the marketer to specify a data field, an operator and a value, as well as a button or element allowing for adding a second condition, joined by AND or OR. Accordingly, the marketer can establish as exit criteria a conditional statement that references any of a large number of data fields that are part of a contact record in the contacts database. This allows for significant flexibility in defining the exit criteria. Furthermore, multiple conditions can be joined together. Finally, although not explicitly illustrated in FIG. 4, the marketer may add to an automated marketing campaign more than one instance of exit criteria. Accordingly, during an active automated marketing campaign, a member of the target audience may exit the target audience for any of several different reasons, based on actions of the person satisfying any one of several different conditional statements associated with predefined exit criteria.

In the case of custom exit criteria 406, the conditional statement 408 is used to establish a contact grouping query (e.g., for defining a contact group), which is then used to create a group of contacts satisfying the condition(s) 408. Accordingly, as contact records are updated with new and updated contact data during an active automated marketing campaign, a contact record may be added to the contact group that is associated with the custom exit criteria. When this occurs, the contact is considered to have exited the marketing campaign and will no longer be sent any messages as part of the automated marketing campaign.

Figure 5:
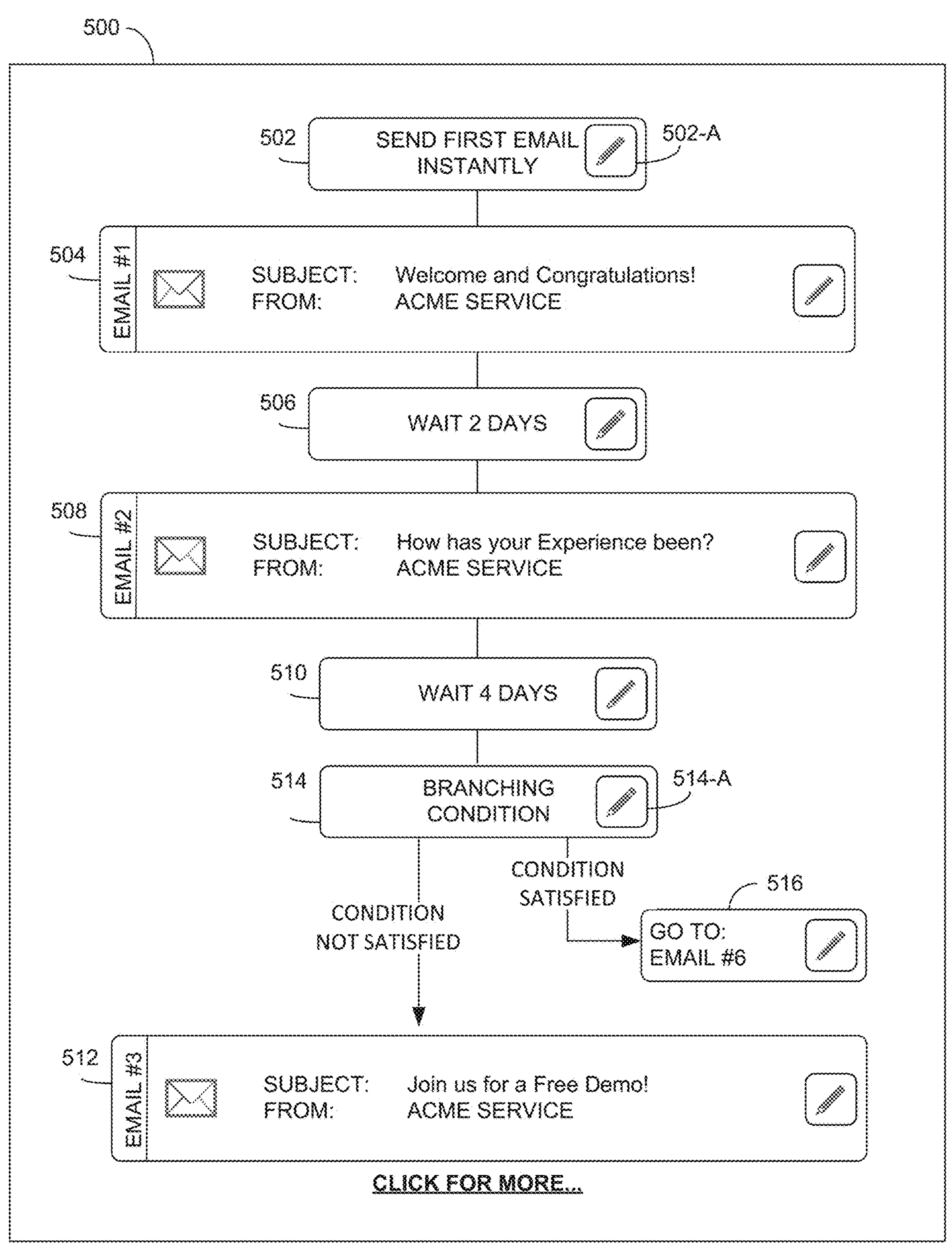
FIG. 5 is a user interface diagram illustrating an example of a user interface via which an end-user may establish various configuration parameters for executing an automated marketing campaign, including a branching condition, consistent with some embodiments of the present invention.

FIG. 5 is a user interface diagram illustrating an example of a user interface 500 via which an end-user (e.g., a marketer) may provide data to generate one or more messages (e.g., emails) and establish various configuration parameters for executing an automated marketing campaign, consistent with some embodiments of the present invention. As illustrated in FIG. 5, the user interface 500 shows a visual representation of the flow of an automated marketing campaign. Specifically, the visual representation of the marketing campaign identifies messages—in this specific instance, emails—that are to be communicated to contacts, the order in which the messages are to be communicated, and the amount of time that is to lapse between the sending of the individual messages. In this example, the top-most user interface element 502 includes a graphic or icon 502-A, which, when selected, will present various options allowing the marketer to determine how, or more precisely, when, a first message will be sent. As shown, the current selection indicates that the first email is to be sent instantly—that is, in response to a contact entering a contact group that represents the targeted audience.

Each of the user interface elements labeled as emails (e.g., EMAIL #1 504, EMAIL #2 508, and EMAIL #3 512) represent a message that is part of the automated marketing campaign. By selecting the edit icon associated with each individual email, the marketer can edit the content of the email, for example, including the subject of the email, the designated email address from which the email is to be sent, and the actual content (e.g., text and images) included in the body of the email. In addition, the user interface elements with reference numbers 506 and 510 indicate the amount of time that is to lapse between the sending of individual messages. These values can be set by selecting the edit icon associated with the individual user interface elements.

The user interface element with reference 514 indicates that the automated marketing campaign includes a branching condition. By selecting the edit icon 514-A associated with the branching condition 514, the end-user will be prompted to specify a conditional statement that will be evaluated to determine the flow of messages. Specifically, the branching condition defines a contact grouping query, such that contacts who satisfy the condition are added to the contact group table for the contact group. During the automated marketing campaign, the flow of messages sent to any one contact is determined based on the contact group to which a contact record of the contact has been assigned. As illustrated in FIG. 5, if for a particular contact the branching condition evaluates to true, meaning that the condition is satisfied, the contact will be sent a message (e.g., EMAIL #6) as indicated by the user interface element with reference 516. However, if the branching condition evaluates to false, meaning the condition is not satisfied, the contact will be sent a different message (e.g., EMAIL #3). As described in greater detail below, the evaluation of the branching condition occurs on a periodic schedule, and results in various contact records being assigned to different contact group tables. At runtime of the automated messaging campaign, the determination of which flow of messages are communicated to any one contact is determined by the contact group table that the contact record of the contact is a member.

Although not shown in FIG. 5, when a marketer has completed entering information to define an automated marketing campaign, the campaign can be saved. When the marketing campaign is saved, the data that comprises the actual messages and the configuration parameters are stored in a database. During the active stage of the marketing campaign, various tasks are executed to read data from the database, for example, to determine the order of messages to be sent to a contact and so forth.

Figure 6:
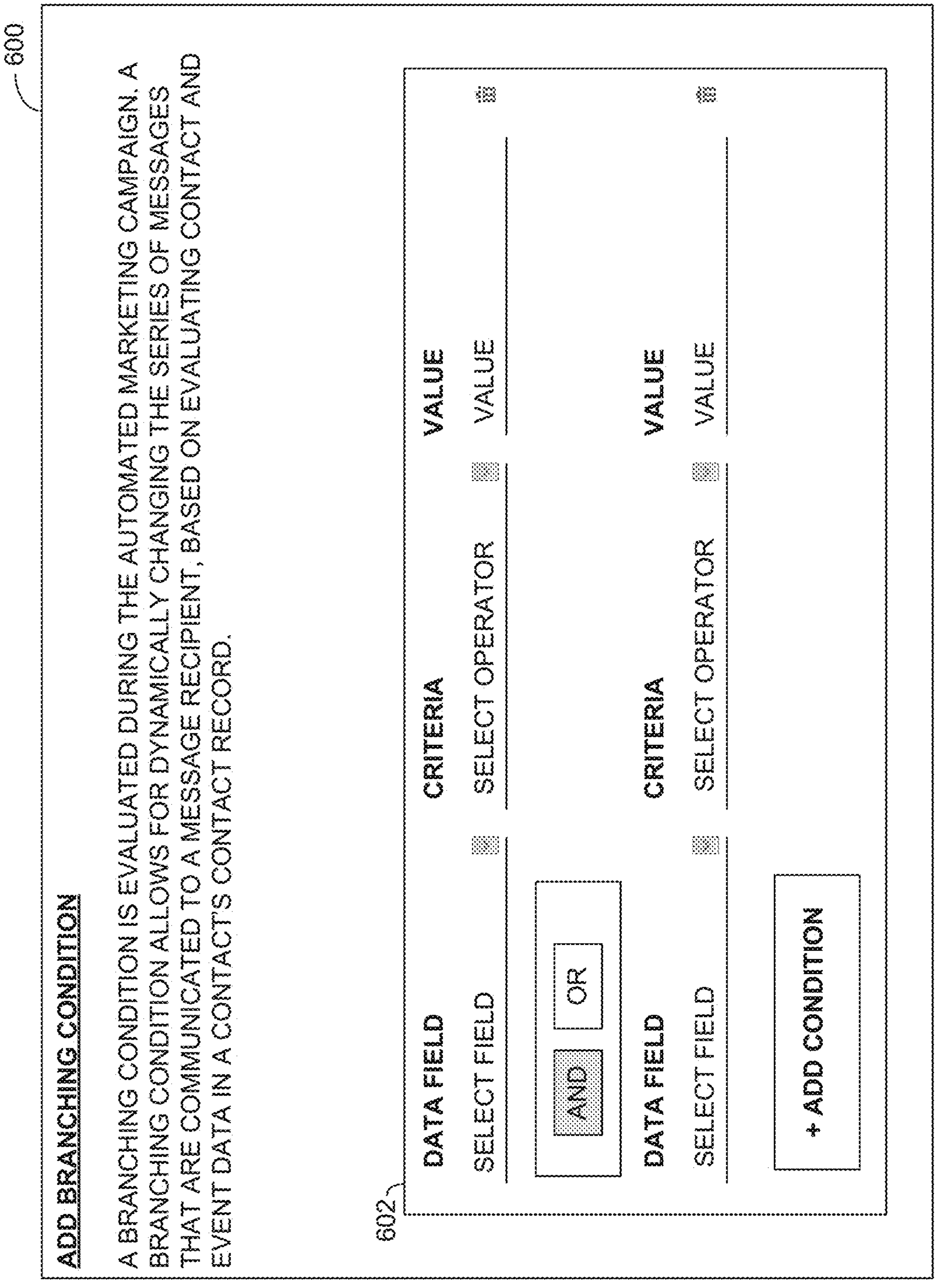
FIG. 6 is a user interface diagram illustrating an example of a user interface via which an end-user may specify a branching condition, which will be evaluated during an active campaign, and may result in dynamically changing the series of messages that are communicated to a member of the target audience, consistent with embodiments of the present invention

FIG. 6 is a user interface diagram illustrating an example of a user interface via which an end-user may specify a branching condition, which will be evaluated during an active campaign, and may result in dynamically changing the series of messages that are communicated to a member of the target audience, consistent with embodiments of the present invention. The user interface 600 shown in FIG. 6 may be presented to a marketer, as an end-user of a messaging system, as a result of the marketer selecting the user interface element with reference number 514-A in FIG. 5. For instance, when generating a flow for a marketing campaign, the marketer may select a graphical representation of the branching condition in order to define the branching condition. In this example, the marketer is prompted to specify a condition 602, or multiple conditions joined by an AND or OR operator. With some embodiments, the drop-down list associated with the data field may be populated with the names of various data fields that are part of a contact record. Accordingly, if an end-user has specified any custom fields, those fields would be reflected in the drop-down list. Upon completion of defining the branching condition, a contact grouping query will be generated for the branching condition. When the contacts service executes the contact grouping query, a group of contacts having contact records that satisfy the branching condition will be generated.

Figure 7:
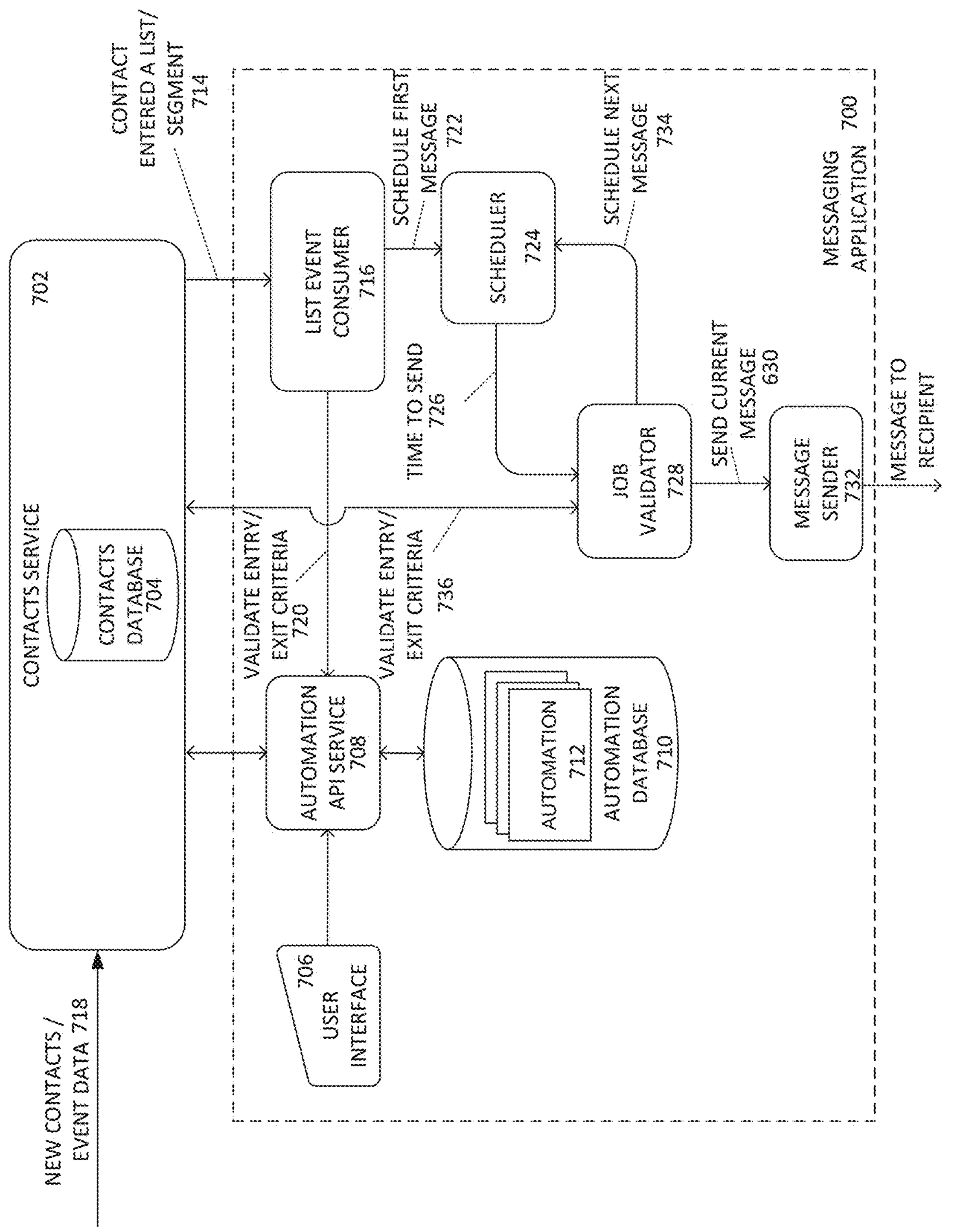
FIG. 7 is a diagram illustrating an example of various functional components included in a messaging system that facilitates automated marketing campaigns that support automated exit criteria, consistent with embodiments of the invention.

FIG. 7 is a diagram illustrating an example of various functional components included in a messaging system that facilitates automated marketing campaigns, or automations, that support branching conditions, consistent with embodiments of the invention. As illustrated in FIG. 7, the messaging system is generally comprised of two primary components—the messaging application 700 and the contacts service 702, which maintains the contacts database 704 and the various contact group tables or contact groups that define the target audience, the exit criteria audience and various branching condition audiences. The messaging application 700 has a user interface component 706, via which data is communicated to the automation API service 708. The user interface component 706 facilitates the presentation of various user interfaces to an end-user, or marketer, allowing the end-user to establish a marketing campaign. Via the user interfaces, an end-user generates the content for each message and specifies the various configuration parameters that determine the behavior of an automation. Specifically, in addition to facilitating the creation of the actual messages, the one or more user interfaces presented to an end-user allow the end-user to establish configuration parameters for an automation, which may include, for example, the entry criteria, the exit criteria, the order of messages, the time between sending messages (e.g., the schedule), branching conditions, among other parameters.

Consistent with some embodiments, the user interface component 706 may be facilitated with a web server, such that the end-user accesses the various user interfaces using a web browser application. In any case, via the user interfaces facilitated via the user interface component 706, the end-user is able to establish and define an individual automated marketing campaign, or automation 712, which is stored in the automation database 710. With some embodiments, the configuration of each automation is accomplished via an automation API service 708. For example, when an end-user defines a target audience by generating a contact group (e.g., as illustrated in FIG. 3), an API call may write the contact group definition (e.g., a contact grouping query) to a database (not shown) managed by the contacts service 702. Similarly, when an end-user establishes custom exit criteria (e.g., as illustrated in FIG. 4), a contact group query is generated based on the specified conditional statement defining the exit criteria and written to a database managed by the contacts service 702. When the user specifies a branching condition, a contact grouping query is generated based on the specified conditional statement defining the branching condition, and written to the contact group database managed by the contacts service 702. Once the contact grouping query for the target audience has been established, the contact grouping query will be processed to generate the group of contact records representing the target audience. Similarly, one or more additional contact grouping queries—each associated with a specific instance of custom exit criteria and/or branching conditions—may be executed to create groups of contacts satisfying respective exit criteria, and branching conditions. Accordingly, as the contact service 702 receives new contact data in the way of new contacts and new customer-related event data associated with existing contacts, the contact records of the contacts will be updated, and in some instances, this will cause contacts to be added to, or removed from, different contact group tables—including those that define the target audience, the contacts who satisfy exit criteria, and the contacts who satisfy various branching conditions.

Once the automated marketing campaign or automation has been defined and stored in the automation database 720, an end-user will activate the automation. Accordingly, a data field associated with the automation, as stored in the automation database 710, may be updated to indicate that the automation has been activated.

As indicated by the line with reference number 718, as new contact information is received at the contacts service 702, the contact and event data 718 is written to the contacts database 704 as a scheduled task is executed to periodically execute the various contact grouping queries, thereby updating the various contact group tables that store the contact records that define the target audience and any contact groups that are based on custom exit criteria and branching conditions. Accordingly, as the contact group queries are periodically executed, various contact records may be added to or removed from different contact group tables. In some instances, the contact grouping queries may be executed iteratively as defined by a predetermined schedule. For example, with some embodiments, the contact grouping queries may be executed on an hourly basis, so that the contact groups are fresh. However, consistent with some embodiments, as the scheduler 724 is performing the task of executing each step of a marketing campaign, the scheduler may invoke a query execution triggering event, causing the contact grouping queries for a particular marketing campaign to be executed in response to the event. By triggering an update to the contact groups for the marketing campaign, the freshness of the data can be guaranteed prior to the execution of a task that may result in sending a message. This will ensure that each contact receives the most relevant message, as the message will be based on the contact group of which the contact is a member.

During the active stage of an automation, the contacts service 702 will publish data relating to the membership of contacts in various lists or contact groups (e.g., the target audience) via a publish-subscribe message distribution service—as indicated by the line with reference number 714. For example, the contacts service 702 will publish a stream of delta events relating to the contacts that have been added to various contact groups or lists, but specifically, any contacts added to a contact group associated with entry criteria or a target audience of a marketing campaign. The list event consumer 716, which subscribes to messages posted by the contacts service 702, receives and processes the stream of delta events published by the contacts service 702, including the data identifying the contacts that are new members of various lists or contact groups. The list event consumer 716 will check the received data against any active automations for a specific entity (e.g., a customer or end-user of the messaging system), as indicated by the line with reference number 720. Specifically, based on the data 714 received from the contacts service 702, the list event consumer 716 will determine if any contacts satisfy entry or exit criteria for an active automation. In general, this is accomplished by comparing the contact group or list identifiers that indicate the contact group or list that a contact is assigned to, as indicated in the data 714 received from the contacts service 702, against the contact group identifiers associated with the target audience defined by an automation 712 in the automation database 710.

By way of example, if data 714 received at the list event consumer 716 indicates that a contact record has been added to a contact group associated with the entry criteria for an automation (as determined by the validation step 720), the list event consumer 716 will then communicate information—as indicated by the line with reference number 722—to the scheduler 724, directing the scheduler 724 to schedule a task for the sending of a message, as specified in the relevant automation 712, as ready from the automation database 710. As the automation 712 may have a defined schedule for the sending of messages, when the time comes to actually execute the scheduled task and send the message, per the schedule, the scheduler 724 will communicate instructions to the job validator 728—as indicated by the line with reference 726—instructing the job validator 728 to proceed with validating the task of sending the message, just before executing the task to send the message. Accordingly, when the job validator 728 receives instructions 726 from the scheduler 724, the job validator 728 will perform a validation operation to determine which contact group a contact is currently in—as indicated by the line with reference number 736—just prior to instructing the message sender 732 to send a message. Accordingly, if the job validator determines that a contact who is scheduled to receive a message as a next step in the marketing campaign has changed contact groups-specifically, meaning that the contact has entered a contact group associated with a branching condition, then the job validator 728 will read configuration data associated with the automation 712 stored in the database 719 to determine the specific message, associated with the contact group of the branching condition, is to be sent to the contact.

Here, validating the entry and exit criteria, and branching conditions, may depend upon how the automation was configured. For example, if no specific exit criteria has been established for the automated marketing campaign (consistent with the option having reference number 402 in FIG. 4), then the job validator 728 need not perform any validation task. However, if the automation has been configured such that each contact should receive the next message in a series of messages so long as the contact continues to satisfy the entry criteria (consistent with the option having reference number 504 in FIG. 5), then the job validator 628 will validate that the contact is in the segment defining the target audience, prior to executing the task of sending the next message. Finally, if the automation has been defined with custom exit criteria (consistent with the option having reference number 504 in FIG. 5), the job validator 628 will confirm that the contact record for the contact is not in the segment of contacts associated with the specified exit criteria, prior to executing the task to send the next message.

Between the sending of each message as set forth by a specific automation, the job validator 628 will re-evaluate the contact record associated with a contact to whom a message has been scheduled for sending. If the exit criteria for the automation has been set to "no longer meets entry criteria," each contact's membership in the segment for the entry criteria is reevaluated. If a contact record is no longer in a list or segment for the entry criteria, or the contact has been deleted outright, then the contact will stop receiving any subsequent messages specified for the automation. That contact is considered to have exited the automation. If the exit criteria is set to use custom exit criteria, the job validator 628 will validate the contact record by checking to see if the contact record is in a segment associated with the one or more conditional statements specified as the custom exit criteria. If the contact record is in a segment associated with any one of several exit criteria defined for the automated marketing campaign, the contact is considered to have exited the automation, and the next message of the automation is not sent to the contact.

The job validation task is performed to ensure that a change to a contact record that may have occurred after a message has been scheduled to be sent, but before the actual scheduled time to send the message, has resulted in the contact exiting the target audience. For instance, because there may be a delay in sending a scheduled message to a contact, the job validator 628 ensures that a potential message recipient has not exited the target audience just before the job validator 628 sends instructions 620 to the message sender 632 to send the message. Here, exiting the target audience may occur when the contact record no longer satisfies the entry criteria defining the target audience, or the contact record may satisfy exit criteria.

After validating the entry criteria or exit criteria 636, or the branching conditions, when the job validator 628 sends instructions 630 to the message sender 632 instructing the message sender 632 to send a message to the message recipient, the job validator 628 will also send an instruction 634 to the scheduler 624 to schedule the sending of the next message, if any, in the automation.

By implementing branching logic in this manner, the end-user experience is improved. For instance, when an end-user has taken some action that is consistent a conditional statement of a marketing campaign, the end-user may be removed one contact group, and added to another contact group, and as a result, receive a different series of messaged as part of the automated marketing campaign. In many instances, this will significantly reduce the number of irrelevant messages that are sent to a contact. Furthermore, with some embodiments, an analytics and reporting tool can provide insights into the members of the various contact groups, providing the marketer with valuable insights into the effectiveness of any single series of messages. By way of example, using the analytics and reporting tool, a marketer may discover that a certain percentage of people are receiving two of five messages, before transition to a different contact group associated with a branching condition.

This can be useful information in allowing the marketer to fine tune the content of a message used in a subsequent automation, and/or to fine tune the definition of the target audience for an automation.

Machine Architecture

FIG. 7 is a diagrammatic representation of a machine 800—sometimes referred to as a computing device-within which instructions 810 (e.g., software, a program, an application or app, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine (e.g., client computing device) in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while a single machine 800 is illustrated, the term "machine" shall also be taken to include a collection of machines that individually or jointly execute the instructions 810 to perform any one or more of the methodologies discussed herein. The machine 800, for example, may comprise the client machine(s) 310 or any one of multiple server devices forming part of the customer data platform 300. In some examples, the machine 800 may also comprise both client and server systems, with certain operations of a particular method or algorithm being performed on the server-side and with certain operations of the particular method or algorithm being performed on the client-side.

Figure 8:
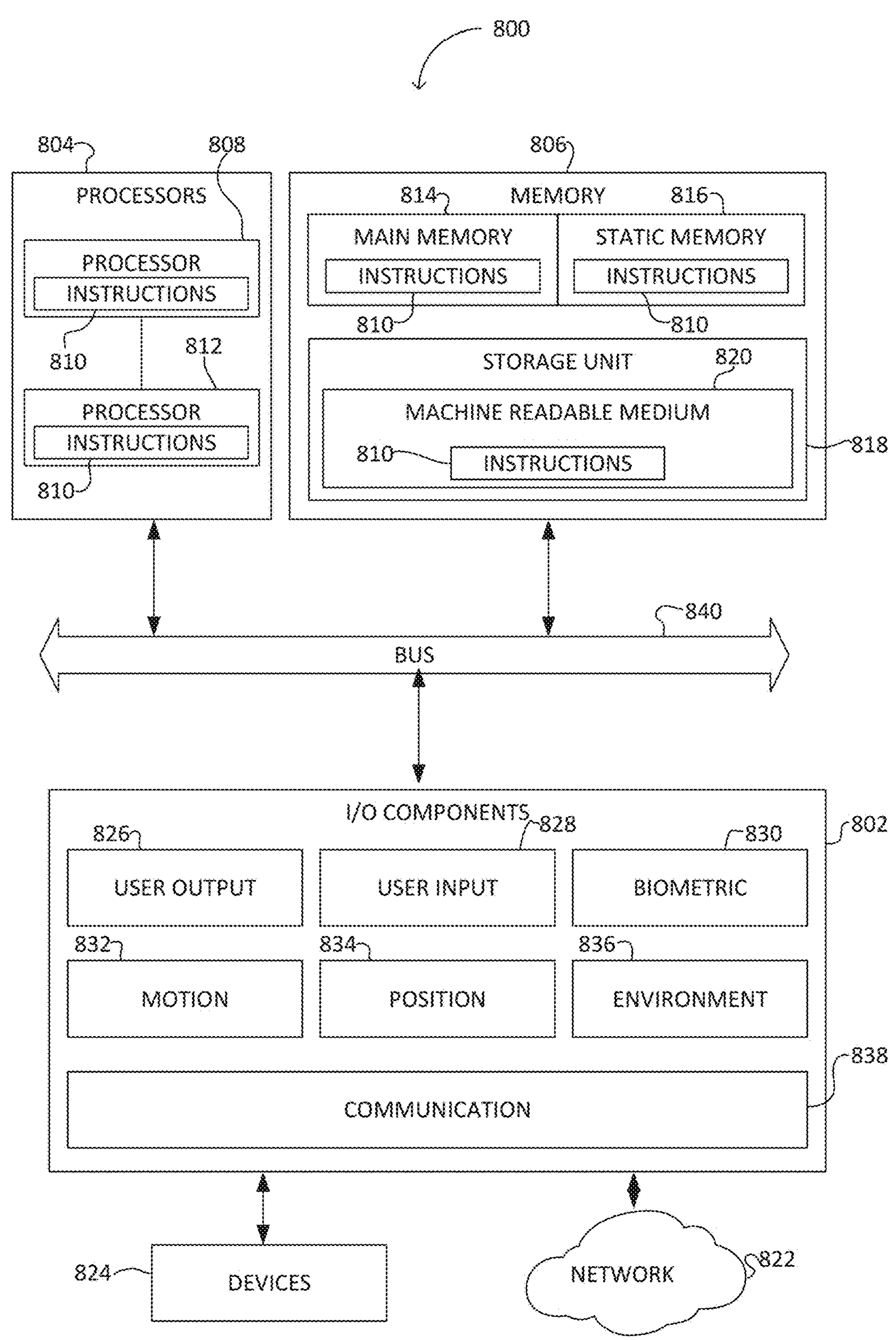
FIG. 8 is an example of a computer system with which any of the methodologies described herein may be implemented.
Figure 9:
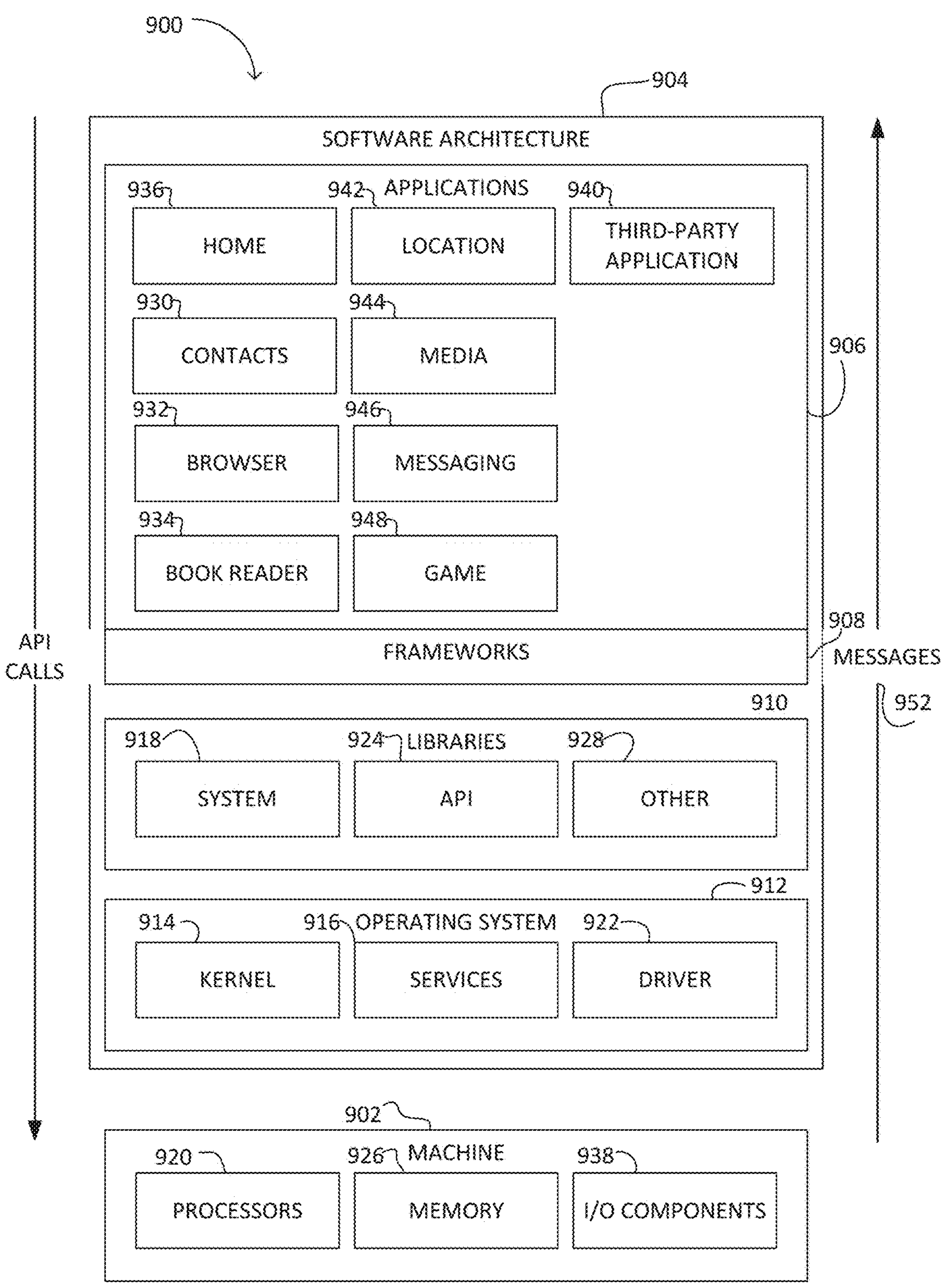
FIG. 9 is a diagram illustrating an example a software architecture or framework, which may be used in implementing any of the various systems and methodologies described herein.

The machine 800 may include processors 804, memory 806, and input/output I/O components 802, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 814, a static memory 816, and a storage unit 818, all accessible to the processors 804 via the bus 840. The main memory 806, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 836, or position components 834, among a wide array of other components. For example, the biometric components 830 include components to detect expressions (e.g., hand expressions, facial expressions, vocal expressions, body gestures, or eye-tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 832 include acceleration sensor components (e.g., accelerometer), gravitation sensor components, rotation sensor components (e.g., gyroscope).

The environmental components 836 include, for example, one or more image sensors or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

Software Architecture

FIG. 8 is a block diagram 900 illustrating a software architecture 904, which can be installed on any one or more of the computing devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionalities. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionalities described herein.

What is claimed is:

1. A computer-implemented method for conducting an automated marketing campaign, the method comprising:

receiving data for generating a plurality of individual messages to be communicated to contacts as part of the automated marketing campaign;

receiving configuration parameters for the automated marketing campaign, the configuration parameters comprising i) a first contact grouping query defining a first contact group representing a target audience for the automated marketing campaign, and ii) a second contact grouping query defining a second contact group, the second contact group for contacts satisfying a branching condition for the automated marketing campaign;

subsequent to the automated marketing campaign being activated, iteratively executing the first contact grouping query and the second contact grouping query to update the first contact group, representing the target audience, and to update the second contact group, representing contacts having contact records satisfying the branching condition, wherein iteratively executing the second contact grouping query occurs as a result of a query execution triggering event, and wherein the first task is scheduled to be executed at the first time that is a predetermined duration of time subsequent to the query execution triggering event;

scheduling a first task to be executed at a first time, wherein the first task is to send a message of the plurality of individual messages to a first contact; and at the first time and prior to sending the message:

performing a validation check, in real-time at the first time just prior to communicating the message, to determine whether the first contact has moved from one contact group to another contact group as a result of the iterative execution of the first contact grouping query and the second contact grouping query, wherein the validation check determines a contact group of which the first contact is a member;

performing a database lookup to identify a specific message in the plurality of messages to be communicated to the first contact based on the contact group of which the first contact is a member; and communicating the specific message to the first contact.

2. The computer-implemented method of claim 1, wherein the plurality of messages are organized as two or more series of messages, including a first series of messages associated with the first contact group and a second series of messages associated with the second contact group, the second series of messages to be communicated to those contacts having contact records indicating the contact satisfies a branching condition for the automated marketing campaign.

3. The computer-implemented method of claim 1, wherein performing a validation check to determine a contact group of which the first contact is a member comprises performing a validation check to determine a contact is a member of a contact group associated with a branching condition specified as a configuration parameter for the marketing campaign, the validation check performed in association with processing a step with which the branching condition is associated.

4. The computer-implemented method of claim 3, wherein the second contact grouping query defining the second contact group, for contacts satisfying a branching condition for the automated marketing campaign, references one or more data fields in or associated with a contact record of a contact, wherein at least one data field is configured to be updated with data obtained when a contact interacts with an application executing on a client computing device, wherein the application executing on the client computing device is configured to send messages to a customer data platform and the customer data platform is configured to forward data to a contacts service for updating contact records.

5. The computer-implemented method of claim 1, wherein executing the second contact grouping query to update the second contact group, representing contacts having contact records satisfying the branching condition, occurs as a result of a query execution triggering event;

wherein the first task is scheduled to be executed at a first time that is some predetermined duration of time subsequent to the query execution triggering event.

6. The computer-implemented method of claim 1, further comprising:

in addition to receiving data for generating a plurality of messages to be communicated to contacts as part of the automated marketing campaign, receiving data indicating a duration of time that is to pass between sending of individual messages in the plurality of messages.

7. The computer-implemented method of claim 1, further comprising:

receiving data indicating one or more conditional statements to be evaluated as exit criteria for the automated marketing campaign; wherein performing the validation check comprises evaluating whether the first contact satisfies the one or more conditional statements specified as the exit criteria.

8. The computer-implemented method of claim 1, wherein scheduling the first task to send the message to the first contact at the first time comprises:

identifying a next message, in an ordered sequence of messages defined for the first contact group, to be sent to contacts that are members of the first contact group; and scheduling the first task to send the identified next message based on configuration parameters indicating a duration of time that is defined to occur between sending of messages in the ordered sequence of messages for contacts that are members of the first contact group.

9. A system for conducting an automated marketing campaign, the system comprising:

one or more processors;

a memory storing instructions that, when executed by the one or more processors, cause the system to:

receive data for generating a plurality of individual messages to be communicated to contacts as part of the automated marketing campaign;

receive configuration parameters for the automated marketing campaign, the configuration parameters comprising i) a first contact grouping query defining a first contact group representing a target audience for the automated marketing campaign, and ii) a second contact grouping query defining a second contact group, the second contact group for contacts satisfying a branching condition for the automated marketing campaign;

subsequent to the automated marketing campaign being activated, iteratively execute the first contact grouping query and the second contact grouping query to update the first contact group, representing the target audience, and to update the second contact group, representing contacts having contact records satisfying the branching condition, wherein iteratively executing the second contact grouping query occurs as a result of a query execution triggering event, and wherein the first task is scheduled to be executed at the first time that is a predetermined duration of time subsequent to the query execution triggering event; and schedule a first task to be executed at a first time, wherein the first task is to send a message of the plurality of individual messages to a first contact; and at the first time and prior to sending the message:

perform a validation check, in real-time at the first time just prior to communicating the message, whether the first contact has moved from one contact group to another contact group as a result of the iterative execution of the first contact grouping query and the second contact grouping query, wherein the validation check determines a contact group of which the first contact is a member; and perform a database lookup to identify a specific message in the plurality of messages to be communicated to the first contact based on the contact group of which the first contact is a member; and communicate the specific message to the first contact.

10. The system of claim 9, wherein the plurality of messages are organized as two or more series of messages, including a first series of messages associated with the first contact group and a second series of messages associated with the second contact group, the second series of messages to be communicated to those contacts having contact records indicating the contact satisfies a branching condition for the automated marketing campaign.

11. The system of claim 9, wherein performing a validation check to determine a contact group of which the first contact is a member comprises performing a validation check to determine a contact is a member of a contact group associated with a branching condition specified as a configuration parameter for the marketing campaign, the validation check performed in association with processing a step with which the branching condition is associated.

12. The system of claim 9, wherein executing the second contact grouping query to update the second contact group, representing contacts having contact records satisfying the branching condition, occurs as a result of a query execution triggering event;

wherein the first task is scheduled to be executed at a first time that is some predetermined duration of time subsequent to the query execution triggering event.

13. The system of claim 9, wherein the memory stores additional instructions that, when executed by the one or more processors, cause the system to: in addition to receiving data for generating a plurality of messages to be communicated to contacts as part of the automated marketing campaign, receive data indicating a duration of time that is to pass between sending of individual messages in the plurality of messages.

14. The system of claim 11, wherein the second contact grouping query defining the second contact group, for contacts satisfying a branching condition for the automated marketing campaign, references one or more data fields in or associated with a contact record of a contact, wherein at least one data field is configured to be updated with data obtained when a contact interacts with an application executing on a client computing device, wherein the application executing on the client computing device is configured to send messages to a customer data platform and the customer data platform is configured to forward data to a contacts service for updating contact records.

15. The system of claim 9, wherein the memory stores additional instructions that, when executed by the one or more processors, cause the system to: receive data indicating one or more conditional statements to be evaluated as exit criteria for the automated marketing campaign;

wherein performing the validation check comprises evaluating whether the first contact satisfies the one or more conditional statements specified as the exit criteria.

16. The system of claim 9, wherein scheduling the first task to send the message to the first contact at the first time comprises: identifying a next message, in an ordered sequence of messages defined for the first contact group, to be sent to contacts that are members of the first contact group; and scheduling the first task to send the identified next message based on configuration parameters indicating a duration of time that is defined to occur between sending of messages in the ordered sequence of messages for contacts that are members of the first contact group.

17. A non-transitory computer-readable medium storing instructions that, when executed by one or more processors, cause the one or more processors to perform steps for conducting an automated marketing campaign, the steps comprising:

receiving data for generating a plurality of individual messages to be communicated to contacts as part of the automated marketing campaign;

receiving configuration parameters for the automated marketing campaign, the configuration parameters comprising i) a first contact grouping query defining a first contact group representing a target audience for the automated marketing campaign, and ii) a second contact grouping query defining a second contact group, the second contact group for contacts satisfying a branching condition for the automated marketing campaign;

subsequent to the automated marketing campaign being activated, iteratively executing the first contact grouping query and the second contact grouping query to update the first contact group, representing the target audience, and to update the second contact group, representing contacts having contact records satisfying the branching condition, wherein iteratively executing the second contact grouping query occurs as a result of a query execution triggering event, and wherein the first task is scheduled to be executed at the first time that is a predetermined duration of time subsequent to the query execution triggering event;

scheduling a first task to be executed at a first time, wherein the first task is to send a message of the plurality of individual messages to a first contact; and at the first time and prior to sending the message:

performing a validation check to determine a contact group, in real-time at the first time just prior to communicating the message, whether the first contact has moved from one contact group to another contact group as a result of the iterative execution of the first contact grouping query and the second contact grouping query, wherein the validation check determines a contact group of which the first contact is a member;

performing a database lookup to identify a specific message in the plurality of messages to be communicated to the first contact based on the contact group of which the first contact is a member; and communicating the specific message to the first contact.

18. The non-transitory computer-readable medium of claim 17, wherein the plurality of messages are organized as two or more series of messages, including a first series of messages associated with the first contact group and a second series of messages associated with the second contact group, the second series of messages to be communicated to those contacts having contact records indicating the contact satisfies a branching condition for the automated marketing campaign.

19. The non-transitory computer-readable medium of claim 17, wherein performing a validation check to determine a contact group of which the first contact is a member comprises performing a validation check to determine a contact is a member of a contact group associated with a branching condition specified as a configuration parameter for the marketing campaign, the validation check performed in association with processing a step with which the branching condition is associated.

20. The non-transitory computer-readable medium of claim 17, wherein executing the second contact grouping query to update the second contact group, representing contacts having contact records satisfying the branching condition, occurs as a result of a query execution triggering event; wherein the first task is scheduled to be executed at a first time that is some predetermined duration of time subsequent to the query execution triggering event.

* * * * *